United States Patent
Chen

(10) Patent No.: US 7,608,013 B2
(45) Date of Patent: Oct. 27, 2009

(54) TRANSMISSION DOWNSHIFT CONTROL METHOD

(75) Inventor: Gang Chen, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 488 days.

(21) Appl. No.: 11/536,734

(22) Filed: Sep. 29, 2006

(65) Prior Publication Data

US 2008/0081736 A1   Apr. 3, 2008

(51) Int. Cl.
*F16H 61/06* (2006.01)
(52) U.S. Cl. ................................. 477/132; 477/161
(58) Field of Classification Search ............ 477/132, 477/139, 148, 149, 161; 475/123
See application file for complete search history.

(56) References Cited

U.S. PATENT DOCUMENTS

| | | | |
|---|---|---|---|
| 4,481,836 A | 11/1984 | Richards | |
| 4,969,098 A | 11/1990 | Leising et al. | |
| 5,642,283 A | 6/1997 | Schulz et al. | |
| 5,803,866 A * | 9/1998 | Tsukamoto et al. | 477/132 |
| 5,809,442 A | 9/1998 | Schulz et al. | |
| 5,835,875 A | 11/1998 | Kirchhoffer et al. | |
| 6,200,242 B1 | 3/2001 | Coffey | |
| 6,292,731 B1 | 9/2001 | Kirchhoffer et al. | |
| 6,301,538 B1 | 10/2001 | Kirchhoffer et al. | |
| 6,370,463 B1 | 4/2002 | Fuji et al. | |
| 6,577,939 B1 | 6/2003 | Keyse et al. | |
| 6,961,646 B2 | 11/2005 | Soliman et al. | |
| 6,978,201 B1 | 12/2005 | Chen et al. | |
| 2005/0096823 A1* | 5/2005 | Soliman et al. | 701/55 |

\* cited by examiner

*Primary Examiner*—Sherry L Estremsky
*Assistant Examiner*—Edwin A Young
(74) *Attorney, Agent, or Firm*—Ralph E. Smith

(57) ABSTRACT

A method of controlling a downshift in a transmission having a main box and a compounder that has at least one gearset and at least one friction element separate from the main box includes initiating an upshift in the compounder including application of at least one friction element (e.g. a clutch) in the compounder, and releasing a friction element (e.g. a clutch) in the main box providing a swap shift. The speed phase in the compounder may trigger the speed phase in the main box, and vice versa. Target fluid volumes in one or both of a clutch being released in the main box and a clutch being applied in the compounder may be controlled and adjusted, if necessary, as a function of specific event timing in prior shifts.

18 Claims, 3 Drawing Sheets

| | | ELEMENTS APPLIED | | | | | | |
|---|---|---|---|---|---|---|---|---|
| GEAR | RATIO | UD | OD | R | 2-4 | L-R | LC | DR | FW |
| 1 | 4.127 | X | | | | X | (X) | | X |
| 2 | 2.842 | X | | | X | | | X | |
| 3 | 2.284 | X | | | X | | X | | X |
| 4¹ | 1.573 | X | | | X | | | X | |
| 4 | 1.452 | X | X | | | | X | | X |
| 5 | 1.000 | X | X | | | | | X | |
| 6 | 0.689 | | X | | X | | | X | |
| R | 3.215 | | | X | | X | X | | |

TRANSMISSION DOWNSHIFT CONTROL METHOD

FIELD OF THE INVENTION

This invention relates generally to vehicle transmissions and more particularly to a method for controlling a downshift in a transmission.

BACKGROUND OF THE INVENTION

An automatic transmission typically includes an electronically controlled hydraulic system. In such an electro-hydraulic system, hydraulically actuated clutches are actuated to couple and decouple gearsets for changing gear ratios of the transmission. Also, a transmission pump supplies pressurized hydraulic fluid from a fluid sump to the clutches through fluid passages. Further, solenoid actuated valves are placed in fluid communication with the fluid passages upstream of the clutches. Finally, a controller receives vehicle input signals, processes the input signals with shift control algorithms to produce solenoid control output signals, and communicates the output signals to the solenoid valves to control flow of fluid to the clutches.

SUMMARY OF THE INVENTION

A method of controlling a downshift in a transmission having a main box and a compounder that has at least one gearset and at least one friction element separate from the main box includes initiating an upshift in the compounder including application of at least one friction element (e.g. a clutch) in the compounder, and releasing a friction element (e.g. a clutch) in the main box providing a double swap shift. The duty cycles of solenoids associated with the releasing and applying elements may be controlled in open loop and closed loop fashion to improve the quality of the shift.

One implementation of a method of controlling a downshift in a transmission having a main box and a compounder coupled to the main box and having at least one gearset and at least one clutch separate from the main box, includes:
- initiating an upshift in the compounder including application of at least one clutch in the compounder;
- initiating venting of a clutch being released in the main box;
- determining occurrence of slip in the compounder and the main box;
- controlling, after slip has occurred in the compounder, the duty cycle of a solenoid associated with the clutch being applied in the compounder as a function of a desired acceleration of the compounder;
- controlling, after slip has occurred in the main box, the duty cycle of a solenoid associated with the clutch being released in the main box as a function of a desired acceleration of the main box;
- determining a target input speed and a target compounder speed for the gear into which the transmission is being shifted; and
- controlling the duty cycle of the solenoid of the clutch being applied when the input speed is greater than the target input speed to control the apply rate of the clutch being applied to bring the input speed to the target input speed.

BRIEF DESCRIPTION OF THE DRAWINGS

The following detailed description of preferred embodiments and best mode will be set forth with regard to the accompanying drawings in which.

DETAILED DESCRIPTION OF PREFERRED EMBODIMENTS

Figures 1, 2:
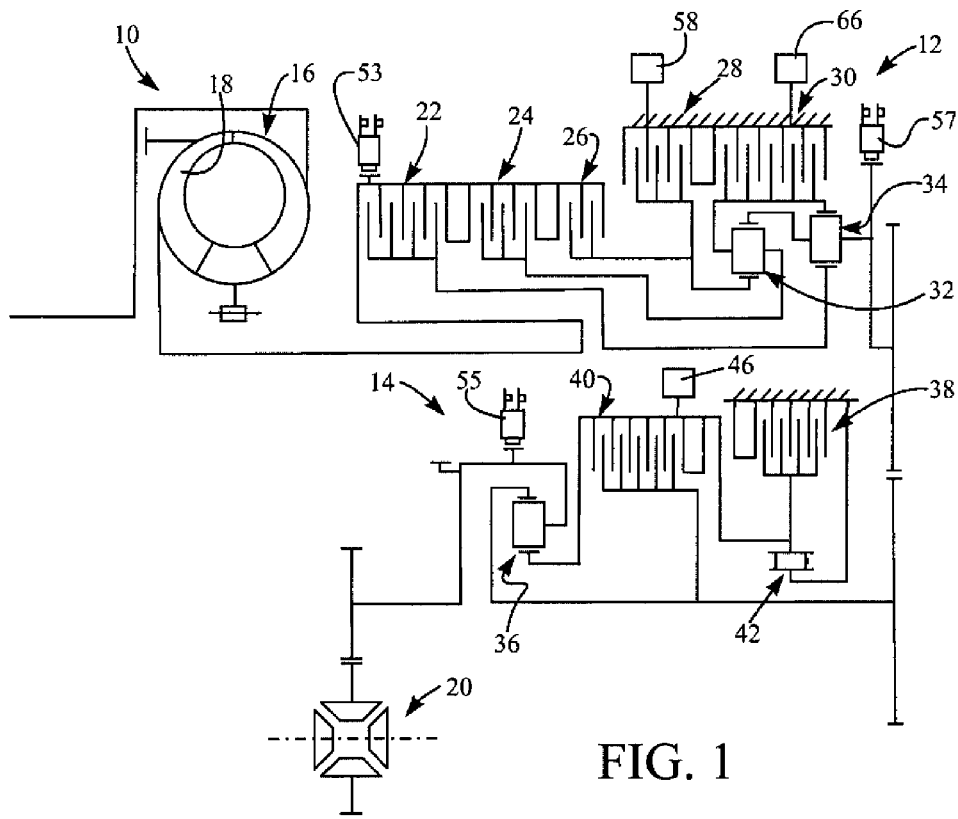
FIG. 1 is a schematic view of one implementation of a transmission.
FIG. 2 is chart illustrating clutches applied in the transmission of FIG. 1 in the various gears of the transmission.

Referring in more detail to the drawings, FIG. 1 illustrates a six-speed transmission 10 that includes a main gear box 12 and a compounder 14 arranged in series. In one implementation, the main gear box 12 is disposed between a torque converter 16 (having a turbine 18) and the compounder 14. The compounder 14, in turn, may be disposed between the main box 12 and a differential 20. The main gear box 12 may include various friction elements, which in one implementation may include clutches such as an underdrive (UD) clutch 22, overdrive (OD) clutch 24, reverse clutch (R) 26, 2-4 clutch 28, and a low-reverse (L-R) clutch 30, and associated gear sets 32,34. By themselves, the clutches and gearsets of the main box 12 provide a 4-speed transmission assembly that may be generally of the type set forth in U.S. Pat. No. 4,969,098, the disclosure of which is incorporated herein by reference in its entirety. The compounder 14 may include one additional gear set 36, and associated friction elements such as a LC clutch 38 and a DR clutch 40 with an over-running or freewheel clutch 42. With the addition of the compounder 14, six speed transmission operation can be obtained. The construction and arrangement of the transmission may be as set forth in U.S. Publication No. 2006/0142106, published Jun. 29, 2006, which is incorporated herein by reference in its entirety, although the method and control for a double swap downshift is as set forth herein.

To accomplish six speed transmission operation, a so-called double swap shift is performed to shift the transmission 10 between $2^{nd}$ and $3^{rd}$ gears. In general terms, during the swap shift an upshift is initiated in the compounder 14 and near the end of the torque phase of that upshift a downshift is initiated in the main box 12. More specifically, to shift from 3rd to 2nd gear in the implementation of the transmission 10 illustrated in FIG. 1, the DR clutch 40 is applied (whereupon the freewheel clutch 42 in the compounder 14 will automatically release), and near the end of the torque phase of that upshift, the 2-4 clutch 28 is released and the L-R clutch 30 is applied in the main box 12 as will be set forth in more detail herein. Careful control of this swapshift permits it to be performed smoothly with minimal power loss, bump or other feedback noticeable by the occupants of the vehicle.

The solenoids that control application or release of the clutches preferably are, but are not limited to, pulse width modulated (PWM) solenoids and hence, the filling and venting of fluid chambers associated with the solenoids are controlled by controlling the duty cycle of the solenoids. The instantaneous duty cycle of a given solenoid may be provided or communicated from a table, list or other source of stored data, or it may be a function of closed loop feedback control from various sensors, a combination of both in a given shift sequence or sequences, or otherwise chosen, determined or selected. The duty cycle at any given time during a shift may be controlled to achieve a certain target or selected volume of fluid in the clutch, which may be related to the pressure and/or torque capacity of the clutch. Such target volume based torque phase control during an upshift is disclosed in U.S. patent application Ser. No. 11/222,066, which was filed on Sep. 8, 2005, and a kickdown shift method for clutch to clutch shift transmissions with accumulators is disclosed in U.S. Pat. No. 6,978,201, both of which are incorporated by reference herein in their entirety.

For an upshift in the compounder, venting of a release element is not needed since there is an overrunning clutch in the compounder. When the apply rate for the element being applied is controlled to develop the torque needed to begin the speed change phase the overrunning clutch will automatically disengage. This provides a matched exchange of torque between the release and apply elements without resistance or fight between the release and apply elements and provides a relatively smooth shift. Once the speed change begins the apply element pressure may be controlled to provide desired acceleration of the compounder speed.

For a downshift in the main box, a soft release feature may be used when the releasing clutch is fast vented to a predetermined volume (indicative of torque capacity). The slow rate change of the soft release permits good control of the turbine speed after slip occurs in the releasing clutch. After the turbine speed reaches a certain point where the time needed for the turbine to reach a target speed for the selected gear is equal to the time needed to fast fill the applying clutch for the down shift, filling of the applying clutch is initiated.

Figure 3:
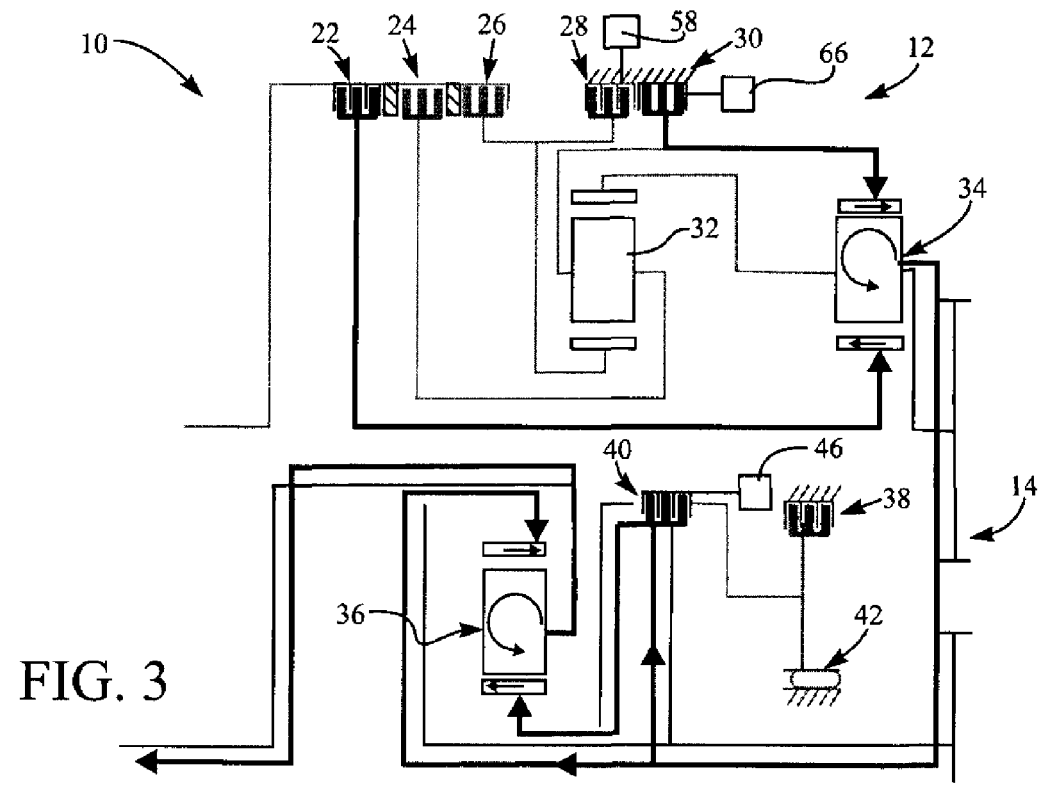
FIG. 3 is a schematic view showing the torque flow in the transmission of FIG. 1 when it is in second gear.
Figure 4:
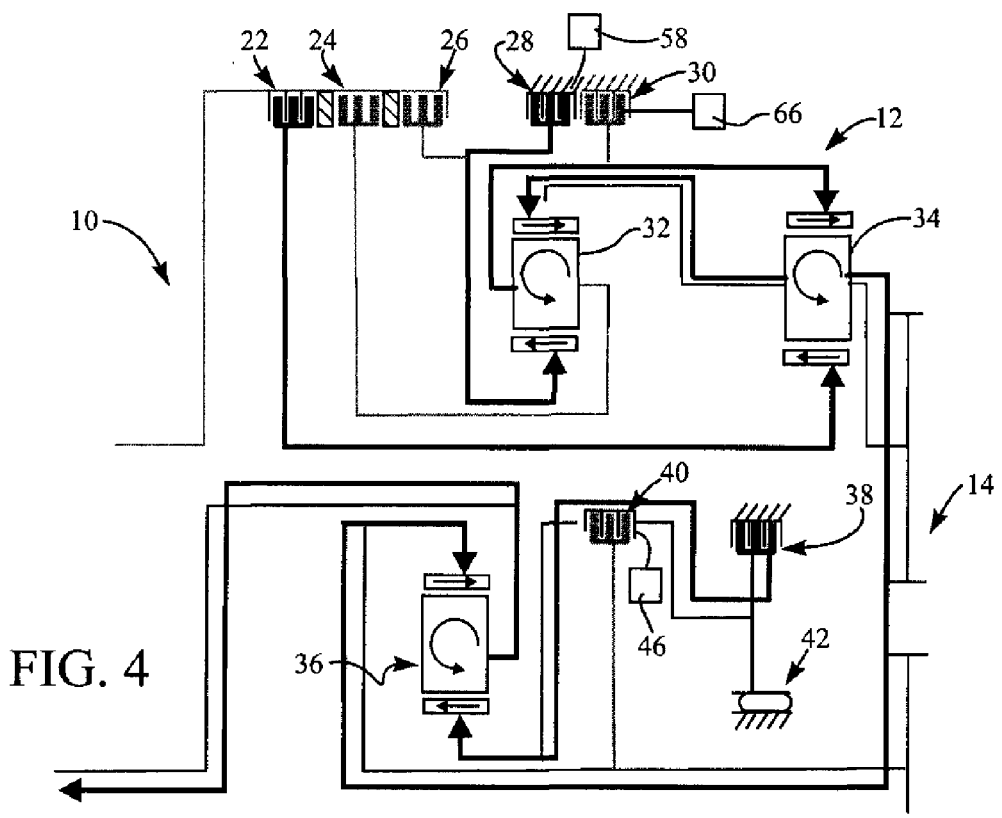
FIG. 4 is a schematic view showing the torque flow in the transmission of FIG. 1 when it is in third gear.
Figure 5:
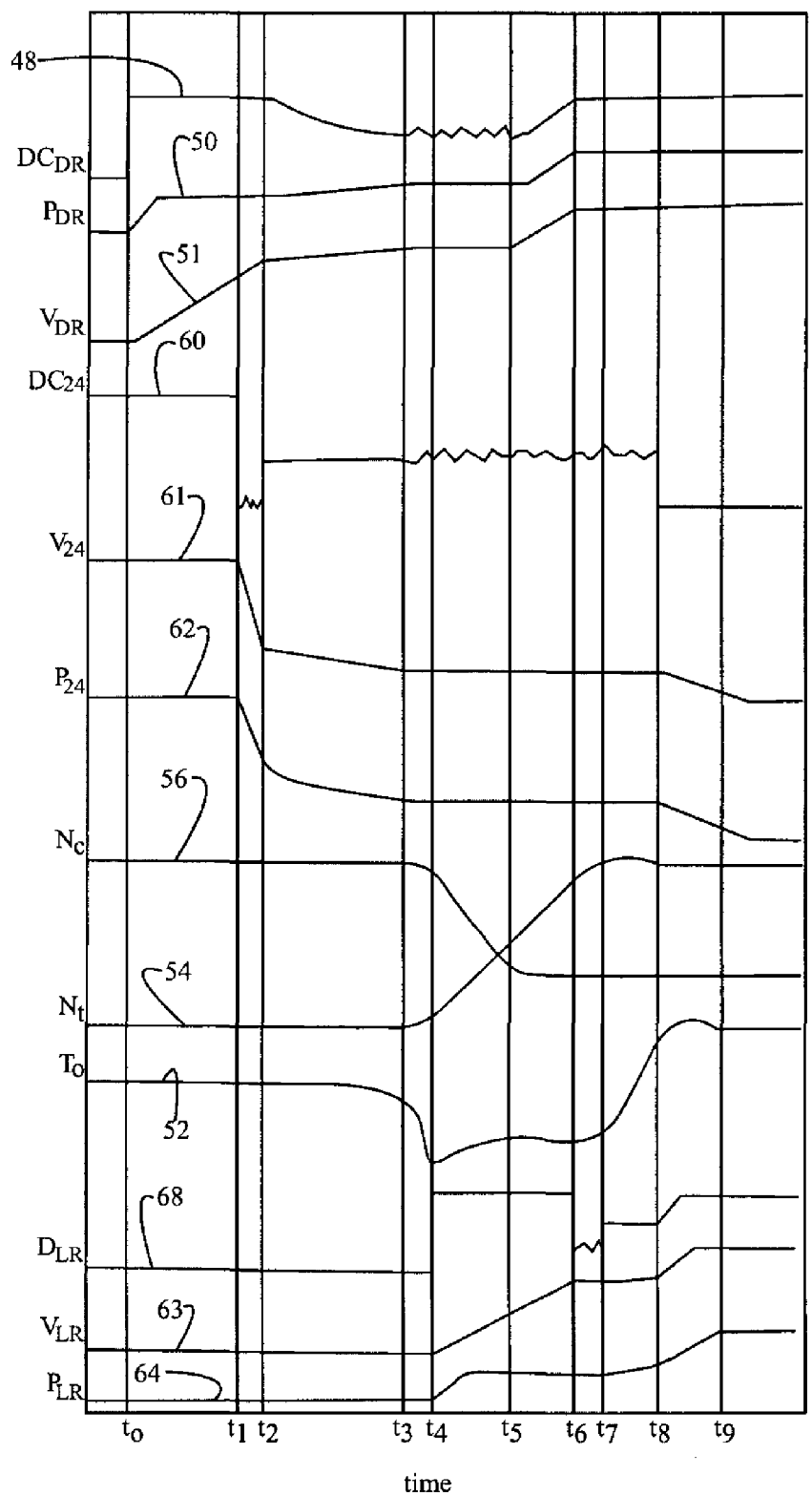
FIG. 5 is a graph of various parameters and components of the transmission and related components during execution of a downshift.

Turning now to one implementation of a double swap shift, some of the time based events and sequence of a 3rd gear to 2nd gear double swapshift are shown in FIG. 5. Prior to initiation of the shift, the UD and 2-4 clutches 22,28 are applied in the main box 12 and the freewheel clutch 42 is applied in the compounder. As a result of the shift, the L-R and DR clutches 30,40 are applied and the 2-4 and FW clutches 28,42 are released (release of the FW clutch, in this example, may automatically occur upon application of the DR clutch 40 in the compounder 14). FIGS. 3 and 4 show torque flow in the transmission in second and third gears, respectively, where applied clutches and active torque flow paths are shown in solid black, and released clutches and inactive flow paths are shown in lighter grey.

At $t_0$, the start of the downshift sequence, the DR clutch solenoid 46 duty cycle is at 100%, as shown in line 48, for a fast fill and rapid increase in volume of the DR clutch 40 as shown in line 51, and an initial increase in pressure as shown in line 50 to overcome the DR clutch return spring force. At $t_1$, venting of the release element, the 2-4 clutch 28, is initiated. Venting of the 2-4 clutch 28 may be accomplished with open loop control and may begin after the volume or pressure in the DR clutch 40 reaches some threshold level, or based on some other criteria, including as a function of the time required for the DR clutch 40 to reach required torque capacity to start the speed phase in the compounder (i.e. the time required for the DR clutch 40 to reach required torque capacity and the time to release the 2-4 clutch 28 can be coordinated so the slip of the 2-4 clutch occurs within a small time window of when the DR clutch 40 reaches required torque capacity to start the speed phase). As shown by lines 54, 56 the torque converter turbine speed and compounder speed may remain relatively constant to this time.

At $t_2$, the torque phase of the upshift in the compounder begins, the fast fill of the DR clutch 40 ends and control of the duty cycle of the DR clutch solenoid 46 begins when the DR clutch fill volume reaches a predetermined or learned volume that corresponds to a predetermined and/or learned pressure just lower than the pressure at which the DR clutch has torque capacity. The solenoid duty cycle may be controlled as a function of various parameters including, for example, engine torque, torque converter turbine speed (which may also be called transmission input speed), compounder speed, transmission output speed, and time. As shown in FIG. 1, the input and output speeds may be measured or sensed by sensors 53,55 respectively, and the compounder speed between the main box 12 and compounder 14 may be sensed at sensor 57. The solenoid 46 duty cycle in this time interval (from $t_2$) should be controlled to gradually reach a learned target volume at $t_3$, as may be determined from or learned from a prior shift, as will be set forth below in more detail.

Also generally at $t_2$, a soft or slower release of the 2-4 clutch 28 is initiated by moderating the duty cycle of its solenoid 58 (as shown in line 60) to slow the rate at which it is vented and hence, the rate at which its volume (as shown in line 61) and pressure drops (as shown in line 62) so the 2-4 clutch remains just above required torque capacity to hold transmission in gear. Turbine speed and compounder output speed may remain relatively constant.

Generally at $t_3$, the speed phase of both the main box and the compounder begins, and this may occur in two ways. The speed phase of the main box and the compounder may occur at generally the same time, or, as set forth below, the speed phase of one of them may trigger the speed phase in the other. The manner in which the speed phases are implemented may be chosen, for example, as a function of the torque level, transmission calibration and vehicle speed.

According to a first way of initiating the speed phase in the main box and the compounder, the DR clutch is controlled (e.g. gradually increased) to a volume below the target volume at which it would require a reduced input torque to initiate the speed phase in the compounder. The reduced target volume may be based on the input torque and the desired acceleration of the turbine speed during the speed phase for the downshift in the main box. Then, after the fast vent to a predetermined volume, the 2-4 clutch may be softly released until the 2-4 clutch slips, and as a result, the turbine speed increases and the torque to the compounder decreases. The pressure in the DR clutch is then sufficient to initiate the speed phase in the compounder due to the decreased torque to the compounder. According to a second way of initiating the speed phase in the main box and compounder, after fast venting to a predetermined volume, the 2-4 clutch volume is controlled (e.g. gradually decreased) to a volume just above the volume where the 2-4 clutch would slip under the then current torque level in the main box so that the 2-4 clutch does not slip under the then current torque level in the main box. Then, the DR clutch volume and hence its torque capacity may be gradually increased to perform a speed change in the compounder, and as a result, the main box input torque increases as the compounder and main box speed decrease. The increased input torque causes the 2-4 clutch to slip because the 2-4 clutch was at a pressure just sufficient to prevent slip at the lower input torque, but not sufficient to prevent slip at the increased input torque level. Accordingly, initiation of the speed phase in the main box may trigger the speed phase in the compounder, and vice versa.

Feedback control of the 2-4 clutch solenoid 58 duty cycle may be initiated when the speed phase is detected. Control of the DR clutch solenoid duty cycle can be accomplished by way of open loop or correlated feed forward and feedback control using learned and/or stored data as well as input torque, turbine speed and compounder speed, to bring the compounder speed to its target speed for the selected gear which, in this example, is $2^{nd}$ gear. Due to the relatively small ratio change in the compounder, the upshift may finish earlier than the downshift in the main box. Feedback control of the 2-4 clutch solenoid 58 duty cycle may be accomplished as a function of feedback from sensors that detect engine torque, turbine speed and compounder speed, by way of examples. As shown in line 60, the duty cycle of the 2-4 clutch solenoid 58 may be increased or decreased to control the pressure in the 2-4 clutch to thereby control the acceleration of the turbine to a desired or predetermined rate of acceleration.

As is known in the art, slip may be detected as a function of the input and output speeds, and the gear ratio. If the input or turbine speed is equal to the compounder speed times the gear ratio in the main box 12, there is no slip in the main box 12. If the turbine speed is greater than the compounder speed times the gear ratio in the main box 12, there is slip in the main box 12. The target volume of the DR clutch at which the speed phase of the compounder begins, and/or the soft release start volume at which the soft release or slower venting of the 2-4 clutch begins may be adjusted if slip in the compounder and/or the main box did not occur, in at least one prior double swap downshift, within a threshold or predetermined time. For example, when the speed phase in the compounder is used to trigger the speed phase in the main box, the DR clutch is fast filled to a fixed fill volume (shown at $t_2$ in FIG. 5) and then more slowly filled to a learned target volume at which the DR clutch has required torque capacity to make the speed change (shown at $t_3$ in FIG. 5). Then, the length of time from when the DR clutch reaches its target volume until the 2-4 clutch slips can be determined. If that time is longer than desired, the soft release start volume of the 2-4 clutch can be decreased. If that time is negative (2-4 cluth slips earlier), the soft release start volume of the 2-4 clutch can be increased. When the speed phase in the main box is used to trigger the speed phase in the compounder, the time from the start of the soft release of the 2-4 clutch from its soft release start volume (shown at $t_2$ in FIG. 5) until the speed phase begins in the main box can be determined. If that time is longer than desired, the soft release start volume of the 2-4 clutch can be decreased to cause the 2-4 clutch to slip sooner during a subsequent double swap downshift. If that time is shorter than desired, the soft release start volume of the 2-4 clutch can be increased to cause the 2-4 clutch to slip later during a subsequent double swap downshift. At the same time, if the time from the 2-4 clutch slip to overrunning clutch slip is longer than expected, the DR clutch limit volume can be increased. If the time is too short and the compounder speed phase is too fast, or the time is negative (overrunning clutch slips earlier), the limit volume of the DR clutch can be decreased.

As shown in line 63, rapid or fast fill of the L-R clutch 30 volume is initiated when the time to fill the L-R clutch 30 is less than or equal to the time to increase the turbine speed from its current speed to a target speed for the selected gear. Initiation of the L-R clutch 30 fast fill is shown at $t_4$ in FIG. 5.

At $t_5$, because the compounder 14 has a small ratio to change, the compounder speed may relatively quickly reach its target speed for the selected gear. When the compounder reaches its target speed, the DR clutch can be ramped up to line pressure, as shown in lines 48, 50 and 51.

The L-R clutch 30 fast fill ends at $t_6$ when the volume of that clutch reaches a learned fill volume. For a time thereafter, the pressure in the L-R clutch 30 is maintained by moderating or controlling the duty cycle of its solenoid 66 to hold its volume, which, as shown in line 68, occurs between $t_6$ and $t_7$.

At $t_7$, the turbine speed is above its target speed for the selected gear ($2^{nd}$ gear in this example), and the fill or apply rate of the L-R clutch 30 is controlled (e.g. gradually increased) to bring the turbine speed to its target speed. At this time, the 2-4 clutch solenoid 58 duty cycle can be zero or off to permit final venting and release of the 2-4 clutch 28 when the turbine speed is close to or within a threshold of its targeted $2^{nd}$ gear speed. Preferably soon thereafter, the 3rd gear to 2nd gear downshift is finished and at $t_8$, the turbine reaches its target speed and the L-R clutch 33 is ramped up to line pressure.

In general terms and according to the implementation discussed above, the speed phase in the compounder 14 may be used to trigger the speed phase in the main box 12, or vice versa, and both may begin in a relatively small time window. This permits the positive torque in the upshift to be canceled in whole or in part by the negative torque in the downshift to enable a smooth shift. The speed phase of the compounder may be relatively short in the presently preferred implementation and so the compounder is permitted to go to its target speed relatively quickly. At that time the application of the clutch in the compounder can be finished. Turbine acceleration may be controlled to bring the turbine to its target speed by control of the duty cycle of the clutch being released in the main box during the double swap shift. When the turbine exceeds its target speed for the selected gear, final application of the clutch being applied in the main box may be initiated.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. For example, while the term 'clutch' has been used throughout the description, that term may be interchangeable with the term 'friction element' or other corresponding structure. Accordingly, the invention should not be limited by a particular definition of the term 'clutch' or by any particular construction of a 'clutch' used by the assignee hereof or otherwise. The invention is defined by the following claims

What is claimed is:

1. A method of controlling a downshift in a transmission having a main box and a compounder coupled to the main box and having at least one gearset and at least one clutch separate from the main box, the method comprising:

initiating an upshift in the compounder including application of at least one clutch in the compounder;

initiating venting of a clutch being released in the main box;

determining occurrence of slip in the compounder and the main box;

controlling, after slip has occurred in the main box, a duty cycle of a solenoid associated with the clutch being released in the main box as a function of a desired acceleration of the main box;

determining a target input speed for the gear into which the transmission is being shifted;

initiating filling of a clutch to be applied in the main box; and controlling a duty cycle of a solenoid of the clutch being applied in the main box when the input speed exceeds the target input speed to control the apply rate of the clutch being applied to bring the input speed to the target input speed.

2. The method of claim 1 wherein the upshift in the compounder is initiated by controlling a duty cycle of a solenoid associated with the clutch being applied in the compounder to provide a rapid increase in a fluid volume in the clutch being applied until a desired fill volume is reached.

3. The method of claim 2 wherein the fill volume is associated with a pressure in the clutch that is less than the pressure at which the clutch has its required torque capacity.

4. The method of claim 1 which also includes controlling, after slip has occurred in the compounder, a duty cycle of a solenoid associated with the clutch being applied in the compounder to control the acceleration of the compounder.

5. The method of claim 1 wherein venting of a clutch being released in the main box occurs at a first rate until a target volume is reached in the clutch and thereafter occurs at a second rate.

6. The method of claim 5 wherein the second rate is lower than the first rate and the second rate is continued until slip occurs in the main box.

7. The method of claim 1 wherein controlling, after slip has occurred in the main box, the duty cycle of a solenoid associated with the clutch being released in the main box is accomplished with feedback to control the acceleration of the main box.

8. The method of claim 1 wherein the fluid volume in the clutch being applied in the compounder is increased at a first rate until a fill volume is reached, and thereafter the fluid volume is adjusted at a second rate until a target volume is reached, and wherein the method also comprises adjusting the target volume if, in at least one prior double swap downshift, slip in the main box occurred at a time different than a predetermined time.

9. The method of claim 1 wherein the fluid volume in the clutch being released in the main box is decreased at a first rate until a target volume is reached, and thereafter the fluid volume is adjusted at a second rate, and wherein the method also comprises adjusting the target volume if, in at least one prior double swap downshift, slip in at least one of the main box or the compounder occurred at a time different than a predetermined time.

10. The method of claim 1 which also includes controlling venting of the clutch being released in the main box to a point above where the clutch being released would slip under current torque conditions in the main box, and wherein the fluid volume of the clutch being applied in the compounder is increased to initiate a speed phase in the compounder which increases input torque to the main box and thereby causes the clutch being released in the main box to slip.

11. The method of claim 10 wherein the fluid volume in the clutch being applied in the compounder is increased at a first rate until a fill volume is reached, and thereafter the fluid volume is adjusted at a second rate until a target volume is reached, and wherein the method also comprises adjusting the target volume if, in at least one prior double swap downshift, slip in the main box occurred at a time different than a predetermined time.

12. The method of claim 1 which also includes controlling filling of the clutch being applied in the main box to a point below where the clutch being released would initiate a speed phase in the compounder under current torque conditions in the compounder, and wherein the fluid volume of the clutch being released in the main box is decreased to initiate a speed phase in the main box which decreases torque to the compounder so that the clutch being applied in the compounder has required torque capacity and a speed phase is thereby initiated in the compounder.

13. The method of claim 12 wherein the fluid volume in the clutch being released in the main box is decreased at a first rate until a target volume is reached, and thereafter the fluid volume is adjusted at a second rate, and wherein the method also comprises adjusting the target volume if, in at least one prior double swap downshift, slip in at least one of the main box or the compounder occurred at a time different than a predetermined time.

14. A method of controlling a double swap downshift in a transmission having a main box and a compounder coupled to the main box, the method comprising:
  initiating application of a clutch in the compounder for an upshift in the compounder;
  initiating release of a clutch in the main box for a downshift in the main box;
  determining a compounder target speed and a target input speed for the selected gear into which the transmission is being shifted;
  controlling a solenoid duty cycle associated with the clutch being applied in the compounder after slip has occurred in the compounder to control the deceleration of the compounder until the compounder speed is within a threshold value of the compounder target speed and thereafter completing the upshift in the compounder;
  controlling a solenoid duty cycle associated with the clutch being released in the main box after slip has occurred in the main box to control the acceleration of the main box until the input speed is within a threshold value of the target input speed and thereafter completing the downshift in the main box.

15. The method of claim 14 wherein the upshift is initiated by controlling the duty cycle of a solenoid associated with the clutch being applied in the compounder to increase the fluid volume in the clutch being applied, and wherein the fluid volume is increased at a first rate until a desired fill volume is reached, and thereafter is increased at a second rate until a target volume is reached.

16. The method of claim 15 which also comprises adjusting the target volume if, in at least one prior double swap downshift, slip in the main box occurred at a time different than a predetermined time.

17. The method of claim 14 wherein initiating release of a clutch in the main box for a downshift in the main box includes venting a clutch to be released in the main box at a first rate until a target volume is reached and venting the same clutch at a second rate after the target volume is reached.

18. The method of claim 17 which also comprises adjusting the target volume if, in at least one prior double swap downshift, slip in at least one of the main box or the compounder occurred at a time different than a predetermined time.

* * * * *